United States Patent [19]
deBuhr et al.

[11] 4,190,209
[45] Feb. 26, 1980

[54] ADJUSTABLE SHEAR BAR FOR A HARVESTER CUTTERHEAD

[75] Inventors: Harold E. deBuhr; Merlyn D. Bass; Jerry L. Krafka, all of Ottumwa; David L. Wolf; Kenneth R. Christopher, both of Cedar Falls, all of Iowa

[73] Assignee: Deere & Company, Moline, Ill.

[21] Appl. No.: 921,282

[22] Filed: Jul. 3, 1978

[51] Int. Cl.² .............................................. B02C 18/16
[52] U.S. Cl. ................................. 241/101.7; 241/222; 241/241; 241/286
[58] Field of Search ................... 51/250; 83/509, 674, 83/700, 349; 241/101.7, 239, 221–225, 241, 286, 287

[56] References Cited
U.S. PATENT DOCUMENTS

| | | | |
|---|---|---|---|
| 3,342,231 | 9/1967 | Waldrop | 241/222 |
| 3,419,055 | 12/1968 | Schwalm et al. | 83/509 X |
| 3,677,316 | 7/1972 | Markham | 51/250 X |
| 3,904,138 | 9/1975 | Maier et al. | 241/221 X |
| 4,055,309 | 10/1977 | Fleming et al. | 241/286 X |

*Primary Examiner*—Mark Rosenbaum

[57] ABSTRACT

A forage harvester has a rotary cylinder type cutterhead mounted in a housing with opposite side walls, crop material being fed into the cutterhead in a generally radial direction over a shear bar adjacent the cutterhead periphery. The shear bar is mounted for fore and aft adjustment toward and away from the cutterhead periphery to maintain the optimum clearance between the cutterhead and the shear bar by means of a mechanism that includes a pair of bell cranks respectively pivotally mounted to support members on the opposite walls, with one end of each bell crank being connected to the shear bar through a fore and aft link while the other end of the bell crank threadably receives the threaded portions of a vertically elongated rod that is rotatably supported adjacent the housing side wall and has an easily accessible head adjacent the top of the housing, whereby rotation of the rod causes the bell crank to rock on its pivot to cause linear fore and aft adjustment of the shear bar. The force exerted through the adjusting mechanism is sufficient to overcome a clamping force exerted by a bolt and nut that clamps the shear bar to the supporting structure at opposite ends of the shear bar without loosening the clamping bolt.

14 Claims, 3 Drawing Figures

ADJUSTABLE SHEAR BAR FOR A HARVESTER CUTTERHEAD

BACKGROUND OF THE INVENTION

This invention relates to an agricultural harvesting machine and more particularly to a forage harvester having a rotary cylinder type cutterhead that registers with an elongated shear bar at the cutterhead periphery, the cutterhead knives cooperating with the shear bar to reduce crop material being fed over the shear bar into the cutterhead.

A forage harvester of the above general type is disclosed in U.S. Pat. No. 3,677,316, also assigned to the assignee herein. The forage harvester disclosed in said patent includes a rotary cylinder type cutterhead having knives at the cutterhead periphery that register with a transverse shear bar adjacent the cutterhead periphery, the crop material being fed over the shear bar and into the cutterhead. As described in said patent, maintenance of the sharpness of the cutterhead knives has long been an irksome problem associated with the operation of such a forage harvester, the knives needing frequent resharpening during operation of the machine. The reverse rotation of the cutterhead, as described in said patent, has resulted in improved sharpening of the knives, although it is still necessary to sharpen the knives at relatively frequent intervals.

Along with maintaining properly sharpened knives, it has been found necessary for proper operation of such machines, particularly with respect to power consumption, that it is necessary to maintain optimum registry of the shear bar with the cutterhead periphery, a clearance of less than 0.015 inch being desirable. However, since each sharpening of the knives removes material from the knives and reduces the diameter of the cutterhead, for optimum performance it is necessary to readjust the shear bar-cutterhead clearance after each knife sharpening. Typically, the shear bars are clamped to a supporting structure and adjustment of the shear has entailed first loosening the clamping bolts at opposite sides of the cutterhead housing, and then rotating an adjusting cam or bolt to shift the shear bar. Adjusting mechanims of the above general type are disclosed in U.S. Pat. Nos. 3,419,055 and 4,055,309. However, access to the clamping and adjusting bolts at the opposite ends of the shear bar has been a problem, since, in a pull type machine, such as shown in said U.S. Pat. No. 3,677,316, the outboard ground engaging wheel is generally disposed adjacent the outer side of the housing side wall, a header is usually mounted on the front of the cutterhead housing, and, at least in some cases, drives from the cutterhead shaft or drives for the feed rolls are also disposed alongside the housing, with shielding covering both the drives and the ends of the shear bars. In the case of the shear bar adjusting mechanism on the inboard side wall, access is also difficult, since various drives for the forage harvester feed rolls and/or header are typically located adjacent the inboard cutterhead side wall. Moreover, relatively large clamping forces are employed to clamp the shear bar so that relatively large tools are necessary to adjust the shear bar, all of which has made shear bar adjustment so inconvenient that in some cases the operator neglects to adjust the shear bar after sharpening of the cutterhead knives, with the accompanying result of loss in forage harvester efficiency.

SUMMARY OF THE INVENTION

According to the present invention, there is provided an improved mechanism for adjusting the clearance between the shear bar and the cutterhead periphery in a forage harvester.

An important feature of the invention resides in the fact that the adjusting mechanism is actuated by an easily accessible element without the necessity of tightening or loosening bolts or nuts in the area adjacent the opposite ends of the shear bar. Another feature of the invention resides in the fact that the adjustment is accomplished without the necessity of loosening the device for clamping the shear bar in place. More specifically, the adjusting mechanism provides sufficient mechanical advantage to shift the shear bar while the shear bar is still in a clamped condition, the force exerted by the adjusting mechanism being sufficient to overcome the clamping force.

Another feature of the invention resides in the fact that conventional easily available tools are utilized to actuate the adjusting mechanism. Also, the adjusting mechanism lends itself for easy adaptation to remote actuation by some sort of power exerting device, such as hydraulic or electric motor.

DESCRIPTION OF THE PREFERRED EMBODIMENT

Figure 1:
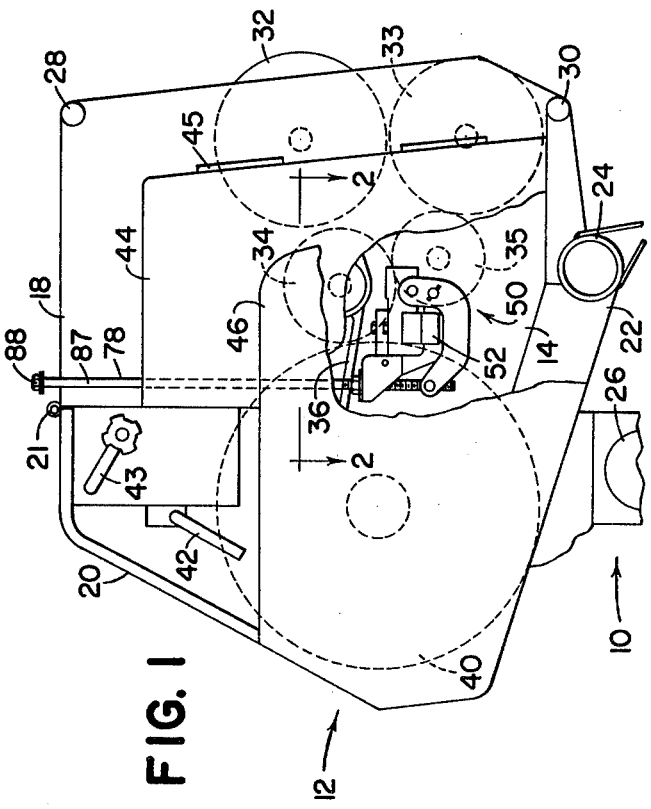
FIG. 1 is a side elevation view of the cutterhead housing portion of a forage harvester embodying the invention, with portions of the shielding and harvester broken away to more clearly show the invention.
Figure 2:
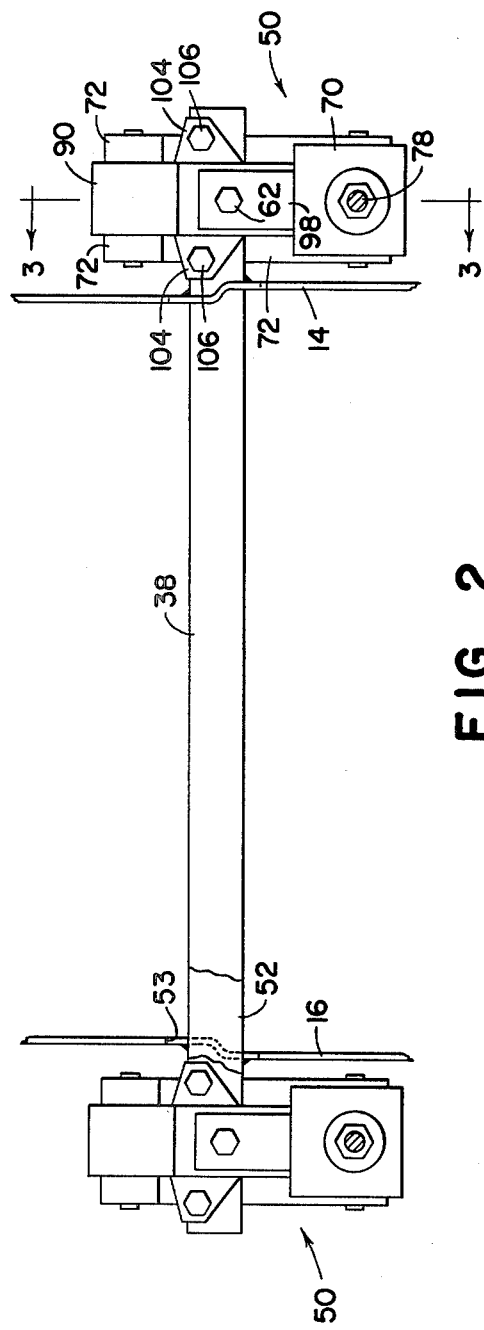
FIG. 2 is a plan view of the shear bar and adjusting mechanism as viewed along the line 2—2 of FIG. 1.

The invention is embodied in a pull-type forage harvester having a mobile main frame 10, only the right rear portion of the harvester being illustrated in the drawings. As is well known, such pull-type harvesters have a generally L-shaped frame, the forward end of the fore and aft leg of the frame including a tongue that is attached to a tractor, while the frame is supported for movement along the ground on a pair of wheels disposed at opposite ends of the rearward, transverse portion of the frame. As is also conventional, a cutterhead housing, indicated in its entirety by the numeral 12, is mounted on the outer end of the rearward transverse portion of the frame outboard of the towing tractor. The cutterhead housing includes opposite upright right and left side walls 14 and 16 respectively and a generally horizontal top wall 18 extending between the opposite side walls. At the rearward end of the top wall 18 is an upper door 20 that also spans the width of the cutterhead housing and is mounted on a transverse hinge 21 which allows the door to be swung upwardly to provide access to the cutterhead housing interior from the top and rear. The cutterhead housing also includes a pair of fore and aft, channel like frame members 22 along the lower portions of the side walls and a tubular transverse frame member 24 interconnecting the frame members 22 between the lower front portions of the side walls. The main frame 10 includes an axle structure 26 generally below the cutterhead housing, the right wheel being mounted on the axle structure outwardly of and adjacent to the right side wall 14.

A pair of upper attachment ears 28 extend outwardly from the opposite side walls at the upper front corner thereof, the upper ears being transversely aligned, with only the right side ear being illustrated in FIG. 1. A similar pair of lower attachment ears 30 project outwardly from the opposite side walls adjacent the lower forward ends thereof, and, as is well known, various types of harvesting headers are removably mounted on the attachment ears and are operative to remove crop material from the field and deliver it rearwardly through the open forward end of the cutterhead housing 12.

Upper and lower front feed rolls 32 and 33 respectively are journaled in and extend between the right and left side walls 14 and 16 at the forward end of the housing 12, and upper and lower rear feed rolls 34 and 35 respectively similarly extend between the opposite side walls. As is well known, the lower feed rolls 33 and 35 are adjacent to one another and are axially fixed, while the upper feed rolls are rotatably supported in a mechanism that permits vertical adjustment of the feed rolls to vary the clearance between the respective upper and lower feed rolls according to the thickness of the mat of crop material being fed rearwardly between the two sets of feedrolls, the upper feed rolls rotating in a clockwise direction as viewed in FIG. 1 while the lower feed rolls rotate in a counterclockwise direction. Only a portion of one of the arms 36 that carries the upper rear feedroll 34 is illustrated.

The feed rolls deliver the crop rearwardly over a transverse shear bar 38 that spans the width of the cutterhead housing immediately to the rear of the lower rear feed roll 35. The rear feed rolls feed the crop material over the shear bar 38 in a generally radial direction into a cylinder type cutterhead 40 that is rotatably mounted in the cutterhead housing 12 and extends between the opposite side walls, only the outer periphery of the cutterhead being shown in phantom lines in FIG. 1 since such cutterheads are well known. As is apparent, the knife cutting edges at the cutterhead periphery register with the shear bar 38.

Mounted in the housing above the cutterbar is a sharpening mechanism of the type that includes a sharpening stone that is adjustable toward the cutterhead periphery and then reciprocated transversely adjacent to the cutterhead periphery by means of a handle 42 on the exterior of the cutterhead housing. The sharpening mechanism is adjusted toward and away from the cutterhead periphery by means of a crank 43 disposed adjacent to the handle 42 on the right side of the cutterhead housing, the interior details of the sharpening mechanism not being shown since mechanisms of the above general type are well known. Preferably, the cutterhead is rotated in reverse during the sharpening process as described in said U.S. Pat. No. 3,677,316. An upright fore and aft front shield 44 is swingably mounted on the right side wall by a pair of vertical hinges 45, the front shield being spaced a short distance outwardly from the right side wall 14 and shielding the mechanism for supporting the upper feed rolls and at least a portion of the drive for the lower feed rolls. A similar upright fore and aft shield 46 is swingably mounted on the cutterhead housing and swings about a hinge at its rearward end, the rear shield covering a belt type drive that connects the cutterhead to the drive shaft for a blower type discharge conveyor. As is also well known, crop material reduced by the cutterhead is discharged rearwardly through a discharge opening at the rear of the cutterhead housing into an auger type conveyor (not shown) which conveys the reduced crop material to a blower type elevator (also not shown) at the left side of the machine. The rear shield 46 is disposed slightly outwardly of the front shield and overlaps the rearward end of the front shield, so that the moving parts on the right side of the cutterhead housing are fully shielded.

The shear bar is supported on the cutterhead housing for adjustment toward and away from the cutterhead periphery to control the clearance between the cutterhead knives and the shear bar. A pair of shear bar mounting and adjusting mechanisms, indicated generally by the numeral 50, connect the opposite ends of the shear bar to the opposite side walls 14 and 16. Since the two shear bar mounting and adjusting mechanims 50 are identical, only the right side mechanism will be described in detail.

A knife bed 52 that is essentially an elongated steel bar having a rectangular cross section extends between the opposite sides of the housing and underlies the shear bar 38, the shear bar similarly being formed of an elongated bar of steel having a rectangular cross section similar to the cross section of the knife bed 52. The opposite ends of both the shear bar and the knife bed extend through openings 53 in the opposite side walls, the openings being sufficiently large to accommodate fore and aft adjustment of the shear bar, although at least a portion of the edge of the opening is adjacent to the knife bed, which is welded to the opposite side walls adjacent to said opening. The knife bed has a vertical bore 54 adjacent each end exteriorally of the side walls, and the shear bar mounting and adjusting mechanism 50 includes a support member 56 having a transverse rectangular upwardly open groove 58 that receives the bottom of the knife bed 52. The support member 56 includes a vertically threaded bore 60 in alignment with the knife bed bore 54, the bore 60 in the illustrated embodiment having by a nut embedded in the support member bore. A vertical bolt 62 extends downwardly through the knife bed bore 54 and is threadable into the threaded bore 60 to connect the support member to the knife bed.

The support member carries a transverse pivot 64 rearwardly of the knife bed, the opposite ends of the pivot 64 extending laterally beyond the opposite sides of the support member. The support member also includes a vertical mast 66 rearwardly of the knife bed, the upper portion of the mast being hollow and including opposite side walls 67, an upright front wall 68 having a fore and aft opening 69, and a horizontal top wall 70 having a vertical bore 71.

Mounted on the pivot 64 on opposite sides of the support member are a pair of identical bell cranks 72 that have rearwardly extending legs 74 connected by a transverse connector bar 76 having its opposite ends pivotally connected to the opposite bell cranks. The connector bar 76 has an internally threaded vertical bore 77 that receives the lower threaded portion of an elongated adjuster screw or threaded rod 78. The threaded portion of the rod 78 also extends downwardly through the bore 71 in the mast top wall, and a pair of teflon bearings 80 are mounted on the rod on opposite sides of the top wall 70, the bearings being retained against the opposite sides of the top wall 70 by a pair of washer-like caps 82 and a pair of nuts 84 respectively threaded on the threaded portion of the rod on opposite sides of the support member top wall 70. The lower nut 84 is locked in position on the threaded portion of the rod by means of a locking pin 86. Thus, the threaded rod is rotatably supported in the support member 56 so that rotation of the rod causes vertical adjustment of the connector bar 76 and consequently rocks the bell cranks 72 about the pivot 64. The threaded rod extends in a vertical direction along the exterior side of the side wall and has an elongated shank 87 adjacent the side wall and a conventional bolt head or input element 88 at approximately the same level as the cutterhead housing top wall 18, the threaded rods of the opposite adjusting mechanisms extending along the exterior sides of the opposite side walls. As is apparent, only the upper portion of the shank 87 protrudes above the front shield 44 on the right side of the machine.

A generally fore and aft link member 90 has a transverse, rectangular cross section groove 92 adjacent its forward end, and a transverse bar 94 extends between the forward ends of the bell cranks 72, the opposite ends of the bar being pivotally connected to the opposite bell cranks. The central portion of the bar has a square cross section, the fore and aft dimension of the bar matching the width of the groove 92 which receives the bar. The bar and groove connection between the bell cranks 72 and the link 90 provides a lost motion connection between the bell cranks and the link in a vertical direction only, so that rocking of the bell cranks about their pivots causes fore and aft movement of the link 90. The link abuts the top and forward sides of the shear bar 38 so that rearward movement of the link causes a corresponding rearward shifting of the shear bar.

The shear bar has a vertical bore or slot 96 aligned with the knife bed bore, the slot 96 having a substantially greater fore and aft dimension than the diameter of the bolt 62 which also extends through the shear bar slot. The link 90 has a similar vertical bore or slot 97 aligned with the shear bar slot, the bolt 62 also extending downwardly through the slot 97 in the link. A fore and aft support extension 98 overlies the rearward end of the link and has a vertical bore 99 aligned with the vertical bore in the support member, the bolt 62 also extending through the support extension bore with the head of the bolt engaging the top of the support extension so that tightening of the bolt compresses the stacked support extension 98, link 90, shear bar 38, knife bed 52, and support member 56. The support extension extends rearwardly through the opening 69 in the mast front wall 68 and includes a transverse groove 100 on its lower side rearwardly of the opening 69, the groove receiving a transverse pin 102 that extends between the mast side walls 67, so that the support extension 98 is locked to the mast in a fore and aft direction. Thus, both the top and the bottom ends of the bolt 62 are retained in a fore and aft direction in the support member. The link 90 includes a pair of laterally extending extensions or wings 104 overlying the top of the shear bar, and a pair of vertical bolts 106 respectively extend downwardly through vertical bores in the wings and into threaded bores in the shear bar to secure the shear bar to the under side of the link.

In operation, the clamping bolts 62 are normally tightened to clamp the support extension 98, the link 90, the shear bar 38, the knife bed 52 and the support member 56 in a solid stack, all of said parts thus being supported on the cutterhead housing via the knife bed 52 which is welded to the opposite housing side walls. Normally, a relatively large clamping force is involved. A clamping bolt torque of 250 ft pounds being typical.

As described above, during operation of the machine it is frequently necessary to resharpen the knives, at which time material is ground from the knives at the cutterhead periphery. It is desirable to maintain only approximately 0.005 to 0.010 inch clearance between the cutterhead periphery and the upper rearward edge of the shear bar, since a greater clearance significantly increases the amount of energy required to shear the crop material moving over the shear bar. Thus, when the knives are sharpened, it is necessary to adjust the shear bar to achieve the proper or optimum clearance.

Figure 3:
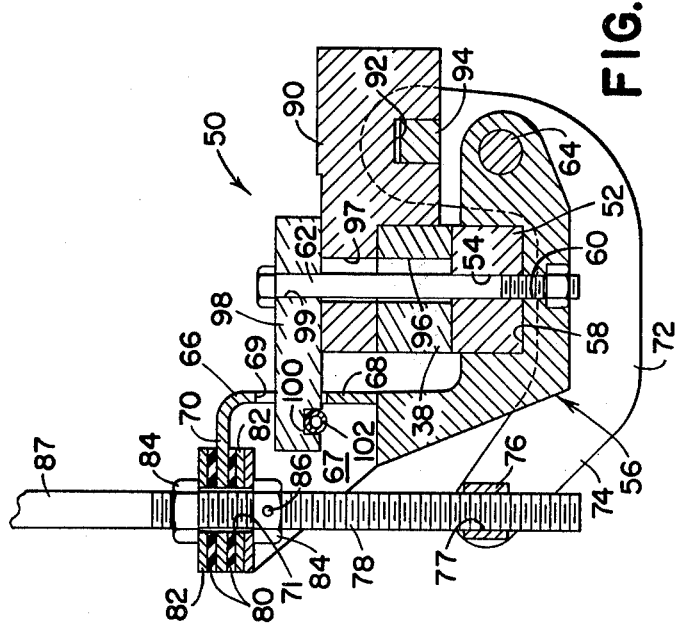
FIG. 3 is an enlarged vertical section through the adjusting mechanism at one end of the shear bar as viewed along line 3—3 of FIG. 2.

To adjust the shear bar, it is not necessary to loosen the clamping bolts 62 due to the large mechanical advantage involved in the adjusting mechanism. The head 88 of the threaded rod or adjusting screw 78 accommodates a standard wrench, the preferred embodiment having a hex head that accommodates a standard ½-inch drive ratchet. As is apparent, the head 88 is slightly above the top of the cutterhead housing wherein it is freely accessible and can easily be rotated by such a conventional tool. To shift the shear bar 38 rearwardly after sharpening to reduce the cutterhead-shear bar clearance, the adjusting screw 78 is simply rotated, and since the adjusting screw is maintained in a vertically fixed position in the top wall 70 of the support member mast 66, rotation of the adjusting screw causes vertical adjustment of the connector bar 76 and the rearward ends of the bell cranks connected thereto. The adjusting screw is rotated so that the bell cranks swing in a counterclockwise direction as viewed in FIG. 3 about the pivot 64, and this motion causes an arcuate motion of the bar 94 at the upper forward ends of the bell cranks. The vertical lost motion connection between the bar and the link 90 results in only fore and aft motion of the link, so that said counterclockwise rocking of the bell cranks causes rearward adjustment of the link. The slot in the link and in the shear bar 38 permit fore and aft adjustment of the link and the shearbar without affecting the position of the clamping bolt 62, provided of course that the frictional fore and aft clamping force between the shear bar and the knife bed and between the link and the support extension are overcome. As is apparent, the support extension is locked in a fore and aft direction so that the support extension and the support member 56 maintain the fore and aft position of the top and bottom ends of the clamping bolts 62. As is also apparent, the above mechanism produces a substantial mechanical advantage, so that a torque of less than 50 ft-lb exerted on the head of the adjusting screw by a typical tool is sufficient to overcome the clamping force, a torque of 20 to 25 ft-lbs normally being sufficient and generating approximately ten thousand pounds of linear force on the link 90 and the shear bar carried thereby. The linear force is exerted through the center of the clamping bolt so as not to cause any distortions in the shear bar.

When adjusting the shear bar, the operator adjusts both of the mechanism 50 on opposite sides of the machine to adjust the opposite ends of the shear bar. Normally the opposite ends of the shear bar are adjusted into the cutterhead until the operator can hear a clicking noise caused by slight contact of the cutterhead with the shear bar. The operator then backs off the shear bar by rotating the adjusting screw in the opposite direction a very short distance until the clicking sound ceases, and then repeats the operation for the opposite side of the cutterhead. It has been found that when the opposite ends of the shear bar are adjusted so that the clicking sound caused by the light engagement of the cutterhead with the shear bar just disappears, the desired 0.005 to 0.010 inch clearance is achieved.

As is apparent, the adjustment can be accomplished while the machine is still running with both the shields 44 and 46 in place. Also, it is not necessary for the operator to stop the machine, and laboriously utilize various gauging devices to measure the shear bar cutterhead clearance. Since the shear bar adjustment is such a quick and simple process with the improved adjusting and support mechanism, the operator is more likely to maintain the optimum clearance to increase the efficiency of his machine. As noted above, the adjusting screws could be rotated by a remotely controlled device such as an electric motor. By using proximity switches or the like to measure the cutterhead-shear bar clearance in conjunction with such a motor, an automatic adjusting system could be devised to maintain the optimum clearance.

We claim:

1. In a forage harvester having a mobile frame, a cutterhead housing mounted on the frame and having opposite side walls and an inlet opening, a rotary cutterhead mounted in the housing and having a plurality of knives with cutting edges at the cutterhead periphery generating a cylinder as the cutterhead rotates and a generally horizontal transverse shear bar extending between the opposite side walls adjacent the cutterhead periphery parallel to the cutterhead axis so that crop material moving through the inlet opening moves past the shear bar into the cutterhead, the combination therewith of improved means for adjustably mounting the shear bar on the housing to adjust the clearance between the shear bar and the cutterhead and comprising:
   a support structure including a pair of support members respectively rigidly connected to the opposite side walls and including a pivot means;
   a pair of lever elements respectively pivotally mounted on the pivot means and having first portion swingable in a generally fore and aft arc in response to rocking of the lever elements on their pivots;
   a pair of generally fore and aft link members respectively connecting the first portions of the lever elements to the opposite ends of the shear bar so that rocking of the lever elements shifts the opposite ends of the shear bar in a generally fore and aft direction toward or away from the cutterhead periphery;
   a pair of clamping means respectively operatively associated with the opposite ends of the shear bar for generally vertically clamping the opposite ends of the shear bar against the support structure so that the shear bar is shiftable in said fore and aft direction only upon exertion of a sufficient force through the link members to overcome the generally vertical clamping force exerted by the clamping means; and
   a pair of force multiplying means respectively connected to the respective lever elements and including input elements, each force multiplying means being operative to rock the lever member about its pivots upon exertion of an input force on the input elements sufficient to overcome the clamping force exerted by the clamping means, said clamping force being substantially greater than the input force, whereby exertion of said input force on an input element in one direction shifts the end of a shear bar toward the cutterhead periphery and exertion of said input force in the opposite direction shifts the end of the shear bar away from the cutterhead periphery.

2. The invention defined in claim 1 wherein the support structure includes an elongated, generally horizontal, transversely extending knife bed having its opposite ends connected to the respective support members and underlying the shear bar, the clamping means clamping the shear bar against the knife bed.

3. The invention defined in claim 2 wherein the shear bar includes a pair of vertical apertures through the shear bar adjacent the opposite ends and the knife bed includes a pair of vertical apertures aligned with the shear bar apertures, the clamping means including a pair of bolts respectively extending through the aligned apertures in the knife bed and shear bar and having upper ends above the shear bar.

4. The invention defined in claim 3 wherein the links are respectively connected to the shear bar adjacent the clamping means bolts, each link being provided with a vertical aperture aligned with the respective shear bar apertures, the clamping means bolts also extending through the link apertures.

5. The invention defined in claim 4 wherein the support members are respectively provided with vertical apertures respectively aligned with the knife bed apertures, the clamping means bolts also extending through the respective support member apertures so that the links, shear bar, knife bed, and support members are vertically clamped together by the clamping means.

6. The invention defined in claim 5 wherein the apertures in the links and the shear bar are elongated in a fore and aft direction to permit said fore and aft adjustment of the shear bar while the clamping bolt remains stationary.

7. The invention defined in claim 6 and including a pair of support extensions respectively connected to the support member and having vertical bores respectively aligned with the support member apertures and receiving the clamping means bolts, the support extensions overlying the links and maintaining the fore and aft position of the upper ends of the clamping means bolts.

8. The invention defined in claim 7 wherein the pivot means on the support members are coaxial and extend in a transverse direction, each lever comprising a bell crank swingably mounted on said pivot means and having one end connected to the link and the other end connected to the force multiplying means.

9. The invention defined in claim 8 and including vertical lost motion means connecting each bell crank to the respective link so that only the fore and aft component of the arcuate movement of the end of the bell crank is transmitted to the link.

10. The invention defined in claim 9 wherein each force multiplying means comprises an elongated rod, rotatably mounted but longitudinaly fixed on the housing and including a threaded portion and an internally threaded element on the lever threadably receiving the threaded portion of the rod so that rotation of the rod rocks the lever about the pivot means.

11. The invention defined in claim 10 wherein the rods of the respective force multiplying devices extend generally vertically adjacent to the housing side walls, each rod having a head exteriorly of the housing and substantially above the level of the shear bar for accessibility to a machine operator.

12. The invention defined in claim 1 wherein the pivot means on the support members are coaxial and extend in a transverse direction, each lever comprising a bell crank swingably mounted on said pivot means and having one end connected to the link and the other end connected to the force multiplying means.

13. The invention defined in claim 1 wherein each force multiplying means comprises an elongated rod, rotatably mounted but longitudinally fixed on the housing and including a threaded portion and an internally threaded element on the lever threadably receiving the threaded portion of the rod so that rotation of the rod rocks the lever about its pivot means.

14. In a forage harvester having a mobile frame, a cutterhead housing mounted on the frame and having opposite side walls and an inlet opening, a rotary cutterhead mounted in the housing and having a plurality of knives with cutting edges at the cutterhead periphery generating a cylinder as the cutterhead rotates, the improvement comprising:

a support structure including a pair of support members respectively disposed adjacent to the opposite side walls and an elongated, generally horizontal, transversely extending knife bed having its opposite ends connected to the opposite support members and the opposite side walls, the knife bed including a pair of vertical apertures respectively adjacent the opposite ends of the knife bed;

a pair of axially transverse, coaxial pivots respectively mounted on the opposite support members;

a transversely elongated shear bar mounted on the knife bed and spanning the width of the housing adjacent the cutterhead periphery so that the cutterhead knives register with the (upper rearward edge of the) shear bar, the shear bar including vertical apertures respectively aligned with the apertures in the knife bed;

a pair of bell cranks respectively rockably mounted on the pivots adjacent the exterior sides of the housing side walls and having first and second ends;

a pair of generally fore and aft link members respectively connecting the first ends of the bell cranks to the shear bar and having a pair of vertical apertures respectively aligned with the shear bar apertures;

a pair of clamping means respectively disposed at opposite ends of the shear bar for clamping the respective link members and shear bar to the supporting structure, each clamping means including a vertical bolt extending through the aligned apertures in the link member, the shear bar, and the knife bed;

a pair of generally vertical rods respectively disposed adjacent (on the exterior of) the opposite side walls and having upper ends adjacent the top of the cutterhead housing and lower threaded portions, the rods being rotatably mounted on the housing but axially fixed; and an internally threaded member on the second end of each bell crank threadably receiving the threaded portion of the respective rods so that rotation of the respective rods causes vertical shifting of the second ends of the bell cranks and fore and aft shifting of the respective link members to shift the link members and the shear bar carried thereby in a fore and aft direction.

* * * * *